United States Patent
Cui (10) Patent No.: US 10,216,381 B2
(45) Date of Patent: Feb. 26, 2019

(54) IMAGE CAPTURE

(71) Applicant: Nokia Technologies Oy, Espoo (FI)

(72) Inventor: Yan Qing Cui, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 13/726,595

(22) Filed: Dec. 25, 2012

(65) Prior Publication Data

US 2014/0181745 A1    Jun. 26, 2014

(51) Int. Cl.
| | |
|---|---|
| *G09G 5/00* | (2006.01) |
| *G06F 3/0484* | (2013.01) |
| *G06F 3/0481* | (2013.01) |
| *G06F 3/0488* | (2013.01) |
| *H04N 5/232* | (2006.01) |
| *H04N 5/262* | (2006.01) |
| *H04N 5/272* | (2006.01) |

(52) U.S. Cl.
CPC ........ *G06F 3/04842* (2013.01); *G06F 3/0488* (2013.01); *G06F 3/04817* (2013.01); *H04N 5/23216* (2013.01); *H04N 5/23229* (2013.01); *H04N 5/23293* (2013.01); *H04N 5/2625* (2013.01); *H04N 5/272* (2013.01)

(58) Field of Classification Search
CPC ...... G09G 5/14; G09G 2340/10; G09G 5/393; G09G 5/00; G06T 11/00; G06T 11/60; G06T 19/00; H04N 1/00127; H04N 5/228; H04N 5/33; H04N 9/74; H04N 5/265; H04N 9/045; H04N 5/232
USPC ....... 345/418, 501, 530, 531, 619, 620, 621, 345/629, 630, 632, 633, 634, 642; 348/164, 207.99, 208.12, 208.14, 222.1, 348/239
See application file for complete search history.

(56) References Cited

U.S. PATENT DOCUMENTS

| | | | | |
|---|---|---|---|---|
| 5,987,104 | A * | 11/1999 | Tomimori | 379/93.23 |
| 7,894,669 | B2 | 2/2011 | Gloudemans, II et al. | |
| 2002/0001036 | A1* | 1/2002 | Kinjo | 348/231 |
| 2003/0012438 | A1* | 1/2003 | Krtolica | 382/173 |
| 2006/0251328 | A1* | 11/2006 | Boo | 382/220 |
| 2007/0025723 | A1* | 2/2007 | Baudisch et al. | 396/287 |
| 2007/0216810 | A1 | 9/2007 | Min et al. | |
| 2008/0037852 | A1* | 2/2008 | Zhou et al. | 382/132 |
| 2008/0089556 | A1* | 4/2008 | Salgian et al. | 382/103 |

(Continued)

FOREIGN PATENT DOCUMENTS

| | | |
|---|---|---|
| WO | 2009/087499 A1 | 7/2009 |
| WO | 2009/109804 A1 | 9/2009 |

OTHER PUBLICATIONS

International Search Report and Written Opinion received for corresponding International Application No. PCT/FI2013/051182, dated May 16, 2014, 9 pages.

*Primary Examiner* — Sarah Lhymn
(74) *Attorney, Agent, or Firm* — Alston & Bird LLP (57) ABSTRACT

A method, apparatus, and computer product for: causing a first image to be displayed to a user, the first image comprising one or more selectable objects; receiving a first user input selecting at least one selectable object from the first image; subsequent to receiving the first user input, causing a second image to be captured; combining the at least one selected object and the second image to create a composite image; and causing the composite image to be stored.

19 Claims, 11 Drawing Sheets

(56) References Cited

U.S. PATENT DOCUMENTS

| | | | |
|---|---|---|---|
| 2010/0172586 A1* | 7/2010 | Sorek | G06T 11/60 |
| | | | 382/181 |
| 2011/0050722 A1 | 3/2011 | Muraki et al. | |
| 2011/0211073 A1 | 9/2011 | Foster | |
| 2011/0242024 A1* | 10/2011 | Fukumoto et al. | 345/173 |
| 2012/0002112 A1 | 1/2012 | Huang et al. | |
| 2012/0242853 A1 | 9/2012 | Jasinski et al. | |
| 2012/0243802 A1* | 9/2012 | Fintel | H04N 5/2625 |
| | | | 382/284 |
| 2012/0307101 A1 | 12/2012 | Fukuya et al. | |
| 2013/0101220 A1* | 4/2013 | Bosworth | G06F 17/3079 |
| | | | 382/195 |

\* cited by examiner

Reference Image

Reference Moving Image

IMAGE CAPTURE

TECHNICAL FIELD

The present application relates generally to the capture of images.

BACKGROUND

Photography has long been popular, but has become particularly popular now that digital cameras permit images to be captured and viewed without the time and cost needed to provide and process celluloid film.

Digital cameras can be manufactured cheaply and made small in size, and they are now included in many diverse types of electronic equipment, for example in mobile telephones, PDAs, personal computers, television sets (e.g. so-called 'smart TVs') and children's toys. This proliferation has also led to an increase in camera usage.

Many users post-process their photographs in order to enhance them. A post-processed image may include features that were not present in the scene that the user originally photographed.

SUMMARY

A first example embodiment provides a method comprising: causing a first image to be displayed to a user, the first image comprising one or more selectable objects; receiving a first user input selecting at least one selectable object from the first image; subsequent to receiving the first user input, causing a second image to be captured; combining the at least one selected object and the second image to create a composite image; and causing the composite image to be stored.

A second example embodiment provides an apparatus comprising: a processor; and memory including computer program code, the memory and the computer program code configured to, working with the processor, cause the apparatus to perform at least the following: cause a first image to be displayed to a user, the first image comprising one or more selectable objects; receive a first user input selecting at least one selectable object from the first image; subsequent to receiving the first user input, causing a second image to be captured; combine the at least one selected object and the second image to create a composite image; and cause the composite image to be stored.

A third example embodiment provides a computer program product comprising a computer-readable medium bearing computer program code embodied therein for use with a computer, the computer program code comprising: code for causing a first image to be displayed to a user, the first image comprising one or more selectable objects; code for receiving a first user input selecting at least one selectable object from the first image; code for subsequent to receiving the first user input, causing a second image to be captured; code for combining the at least one selected object and the second image to create a composite image; and code for causing the composite image to be stored.

Also disclosed is an apparatus comprising: means for causing a first image to be displayed to a user, the first image comprising one or more selectable objects; means for receiving a first user input selecting at least one selectable object from the first image; means for subsequent to receiving the first user input, causing a second image to be captured; means for combining the at least one selected object and the second image to create a composite image; and means for causing the composite image to be stored.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Example embodiments of the present invention and their potential advantages are understood by referring to FIGS. 1 through 10 of the drawings.

A user who has captured a digital image using a camera may choose to copy that image to a computer in order to apply post-processing to it, for example to add objects that have been copied from other images and were not present in the scene that he photographed.

Figure 1:
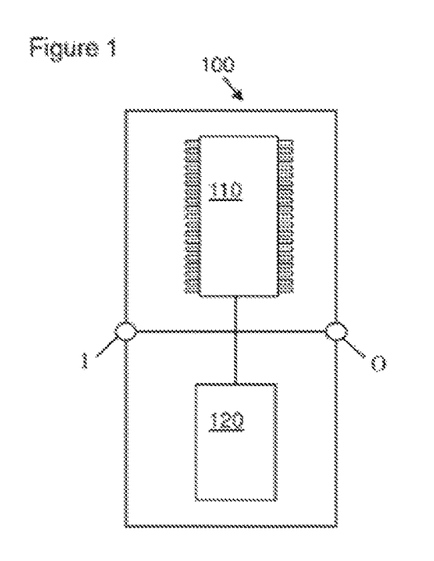
FIG. 1 illustrates an example apparatus.

FIG. 1 shows an apparatus 100 comprising a processor 110, memory 120, input I and output O. In this example embodiment only one processor and one memory are shown but it will be appreciated that other embodiments may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this example embodiment the input I and output O may be part of a connection bus that allows for connection of the apparatus 100 to further components. The processor 110 may be a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example embodiment the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other example embodiments, one or more or all of the components may be located separately (for example, throughout a portable electronic device such as devices 200, 300 (which are example implementations of apparatus 100 or provide a housing and/or additional components on which apparatus 100 is implemented), or through a "cloud", and/or may provide/support other functionality.

Figure 2:
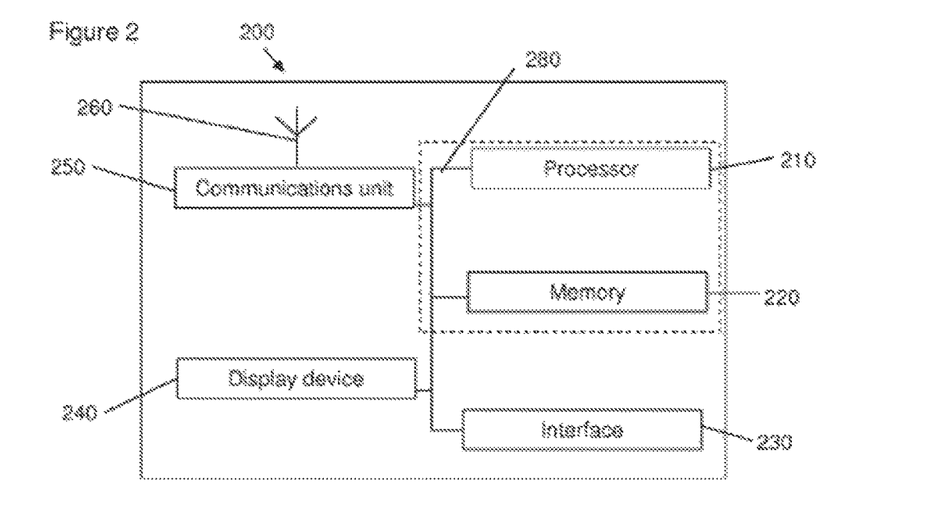
FIG. 2 illustrates another example apparatus.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for an apparatus such as a digital camera, mobile phone, PDA, audio/video player or the like. Such a module, apparatus or device may comprise just a suitably configured memory and processor.

The example device 200 comprises a display 240 such as, a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
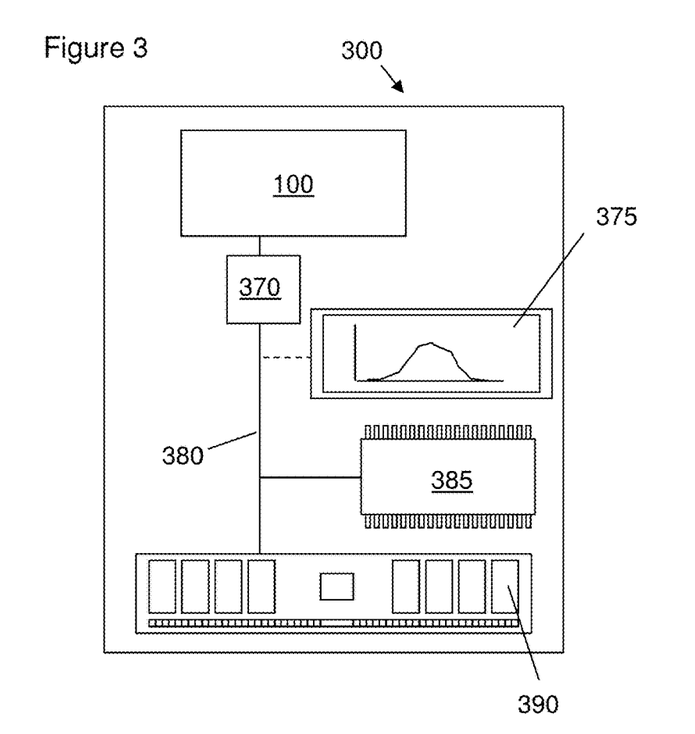
FIG. 3 illustrates a further example apparatus.

Device 300 shown in FIG. 3 is an example implementation of apparatus 100, or may comprise apparatus 100. Device 300 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 (e.g. processor 110) and a storage medium 390, which are electrically connected by a data bus 380. This data bus 380 can provide an active coupling between the processor 385 and the storage medium 390 to allow the data bus 380 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

Figure 4:
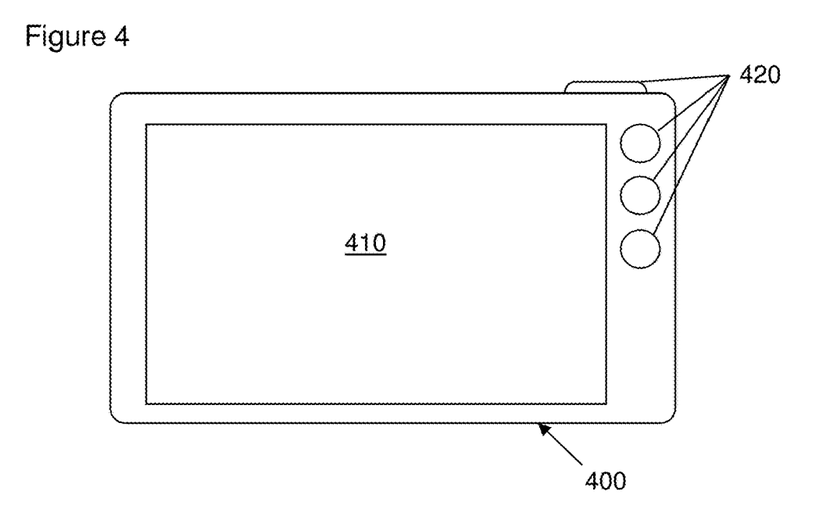
FIG. 4 illustrates a further example apparatus.

FIG. 4 illustrates another example embodiment of the invention, a digital camera 400. The digital camera may comprise a touch screen 410. The digital camera may comprise physical buttons 420.

Figure 5A:
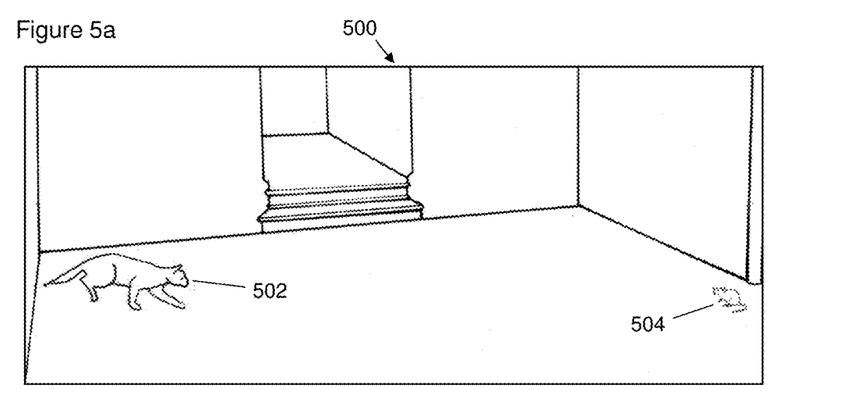
FIGS. 5*a*-5*d* illustrate an example of a method of composing a composite image.

FIGS. 5a-5d illustrate example scenes displayed on display 240, where the displayed scene reflects a composite image captured by the user. FIG. 5a illustrates a scene 500 in which a cat 502 and a mouse 504 are present against a background. This scene 500 is a viewfinder view and its display is caused by an apparatus. The apparatus may be a digital camera such as that 400 of FIG. 4, or it may be another type of apparatus that comprises a camera, such as a computer or a mobile telephone. Alternatively, the apparatus may not comprise a camera at all, but may be in communication with a camera that provides the apparatus with the viewfinder view.

Viewfinder views may be static (e.g. a single image captured by the camera and potentially overlaid with additional content) or dynamic (a substantially real-time view of the camera's current view, again potentially overlaid with additional content). The additional content may comprise e.g. camera settings, and/or selectable objects as will now be described.

Figure 5B:
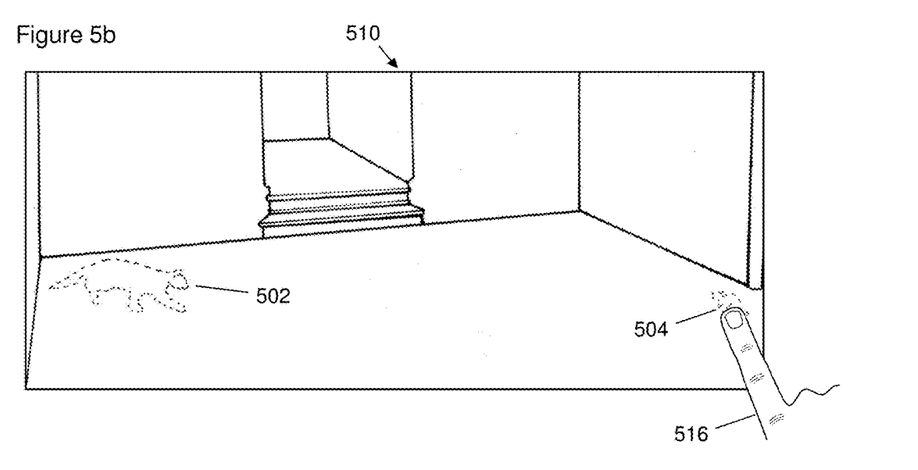

The user 516 is able to select objects from within scene 500. In FIG. 5b the user is shown selecting the mouse 504 by tapping on a touch-sensitive display of the scene 510. In this display of the scene 510, the cat 502 and mouse 504 have been differentiated from the background with dashed outlines. This visual differentiation is to illustrate to the user that these two objects 502, 504 are selectable by the user (e.g. by tapping on the area of the scene 510 that corresponds to the objects).

In the context of this disclosure an object of an image is a portion of the image that is in some way differentiated from the rest of the image. For example, an object may be a subject present in the image such as a person, animal, tree, item of clothing, or other material thing that is represented within the image. An object may comprise more than one subjects, for example a dog wearing a hat may comprise two objects (the dog and the hat), a single object (a dog wearing a hat) or no objects at all (e.g. the dog wearing the hat may be considered part of the background of the image and not recognised as an object at all). A selectable object is an object that the user is able to select.

It will be understood that a touch-sensitive display and a tap gesture are just one of very many possible examples that permit the user to select one or more of the selectable objects. Where the display is a touch-sensitive display then any touch gesture that can identify one or more of the objects for selection may be used in place of the tap user input, for example a swipe gesture or a pinch gesture on top of the area of the display that represents a particular selectable object. Non-touch selection methods may also be used, and may be more appropriate when the display is not a touch-sensitive display. For example a cursor moveable by a mouse, joystick, track pad, or other suitable means may be used to identify a selectable object for selection, with the selection being confirmed by another input, such as a button press. Any suitable selection method may be used.

In viewfinder view of scene 510 the selectable objects were visually differentiated from the rest of the image by giving them a dashed border. It is not necessarily the case that the selectable objects must to be differentiated, but differentiating them may provide the advantage that the user is provided with a hint as to which objects within the image he is able to select.

Any suitable way of visually differentiating the objects from the rest of the image may be employed. For example, the selectable objects may be highlighted by visual differentiation using colour, or image characteristics such as brightness or contrast may be adjusted either in the area of the image corresponding to the selectable objects or in the rest of the image, so as to differentiate them. Other non-visual approaches to differentiation may be used in addition to, or in place of, visual differentiation. For example, the selectable objects may be differentiated using haptics, e.g. by changing the texture of the display in the area corresponding to the selectable objects, or by providing vibrational feedback when the user has moved a means of selecting the selectable object (e.g. his finger, stylus, or a cursor) over the area of the display that corresponds to the selectable object.

In the example of FIG. 5b, the user 516 selects the mouse 504 by tapping on it, but he does not select the cat 502 (in this example the only other selectable object).

Figure 5C:
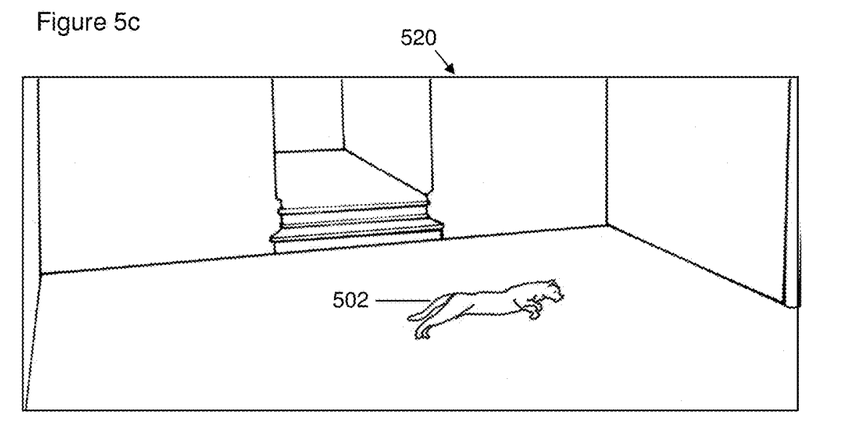

FIG. 5c shows a viewfinder view, of scene 520 that is similar to scene 510, but later on in time. The cat 502 has leapt forward, moving from the left of the scene 510, 520 into the centre. The mouse 504, on the other hand, has run out of the scene and is no longer visible.

Figure 5D:
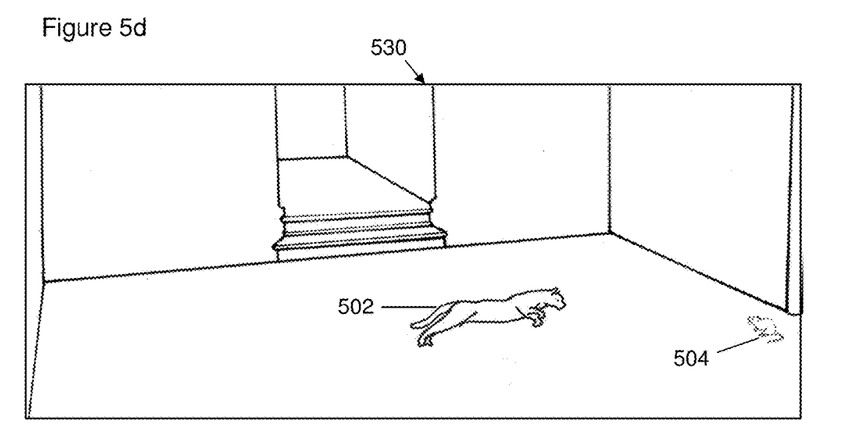

FIG. 5d shows a composite image 530, similar to the scene 520. In contrast to the real scene 520, in the viewfinder view the mouse 504 has remained visible, because it was selected by the user in the earlier viewfinder view of scene 510 of FIG. 5b. The cat 502 is visible only in its new position in the centre of the image, because it was not selected by the user when it was in its previous location. Had the cat 502 been selected in its previous location then it might be shown in both its left and centre positions.

The user then selects to capture the composite image 530, that is an image showing the cat in the centre position and the mouse present in the right of the screen, both set against the background. This captured composite image may be stored to memory, for example a memory of the apparatus capturing the image, or a remote or cloud memory.

The captured image is a composite image, in that it is made up of more than one set of image data combined together to provide a single image. The image data that is combined may include image data relating to any selectable objects that have been selected by the user, and the image available to the camera at the point in time when the user selected to capture the image. In the example of FIGS. 5a-5d these image data sets may comprise image data of the mouse selected in FIG. 5b and the scene in FIG. 5c.

Combining data sets to provide a composite image may be performed in any suitable manner. For example, image data from the scene visible to the camera may be overlaid with image data relating to selectable objects that have been previously selected by the user. Where selectable objects overlap they may be overlaid in the composite image according to any suitable rule—for example more recently selected object may overlay previously selected objects, or may underlie previously selected objects. The user may be provided with a menu or other suitable interface for modifying the order in which the selected objects are overlaid.

In some embodiments the first scene 500 is a still image that has been captured by the camera, for example in response to a user input such as the depression of a shutter key or an equivalent shutter-activating user input. In other embodiments the first scene is a moving image, for example live viewfinder data. When the first scene 500 is a moving image then the selection of an object may comprise the selection of that object as it appears at the moment of time at which the selection was made (e.g. in the current frame of the moving image).

In the example shown in FIGS. 5a-5d the composite image was made up of an object from a single first image (cat 502) combined with a second image (scene 520). However, in other examples the composite image may include objects selected from more than one first image. An example of this is shown in FIGS. 6a-6c.

Figure 6A:
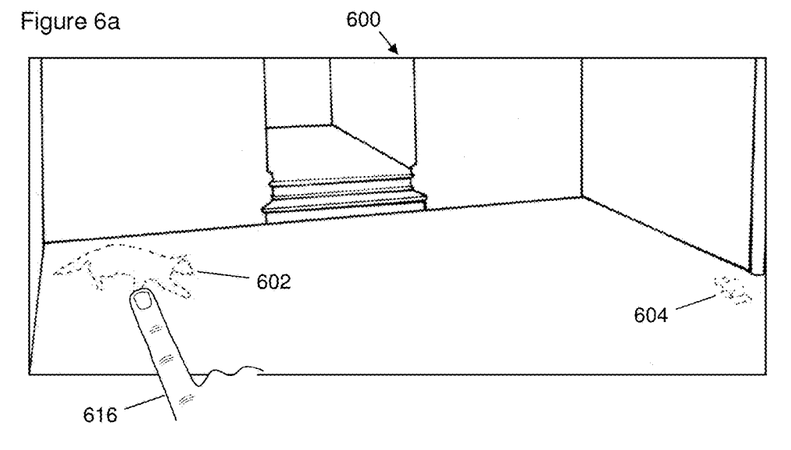
FIGS. 6*a*-6*d* illustrate an example of a further method of composing a composite image.

FIG. 6a shows the initial viewfinder view 600, which shows a first image including a cat 602 and a mouse 604. Both the cat 602 and mouse 604 have been identified as selectable objects and are differentiated as such (in this example by dashed outlines). The user 616 selects the cat 602 only, by tapping on it.

Figure 6B:
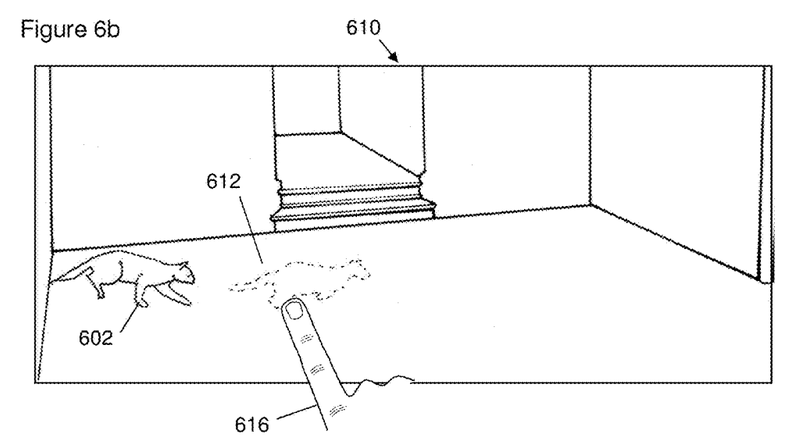

FIG. 6b shows a second viewfinder view 610 shortly after the user has selected the cat 602 in view 600. The cat is shown both in its original position 602 (as selected in view 600) and also in a new subsequent position 612. The mouse 604 has run away and is not visible (it was not selected in view 600). The cat is now selectable at its new position 612, and the user 616 selects it by tapping on it.

Figure 6C:
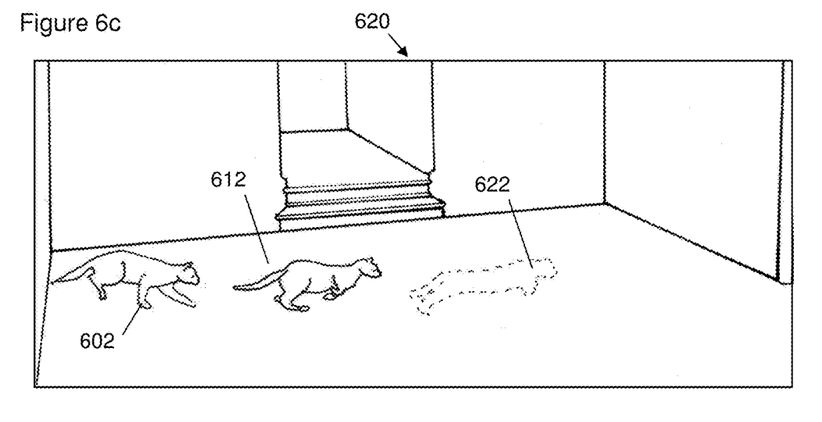

FIG. 6c shows a third viewfinder view 620 shortly after the user has selected the cat 612 in view 610. The cat is now shown its original position 602 (as selected in view 600), its previous position 612 (as selected in view 610) and also in a new subsequent position 622. The mouse 604 has not returned and is therefore again not visible. The cat is now selectable at its new position 622. However, rather than select the cat at its new position 622, the user chooses instead to capture the current scene 630, for example by pressing a shutter button.

Figure 6D:
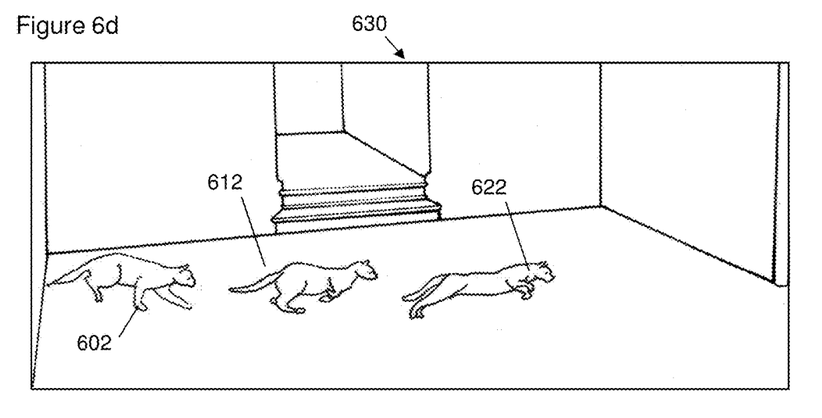

When the image is captured, the two selected objects (the cat at each of positions 602 and 612) are overlaid onto the scene 630 captured by the camera to create a composite image. The resulting image is shown in FIG. 6*d*, and includes the cat at positions 602 and 612 by virtue of these being selected objects, and also includes the cat at position 622 since it was present in this position in scene 630. Note that the mouse 604 is not present—it was not selected as an object in view 600 and has not been present since.

Figure 7A:
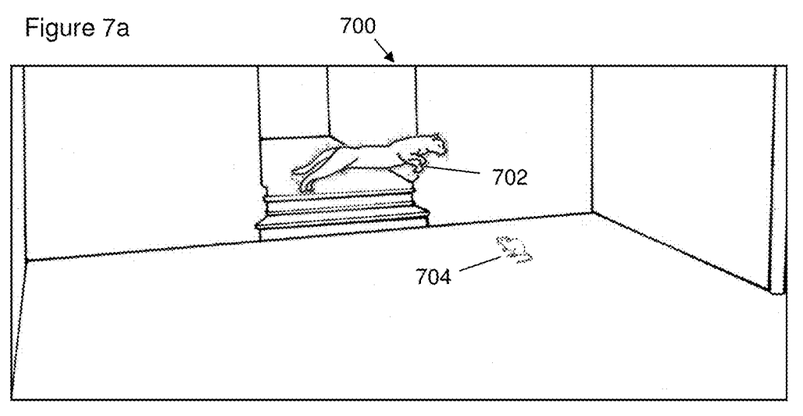
FIGS. 7*a*-7*c* illustrate an example of a further method of composing a composite image.
Figure 7B:
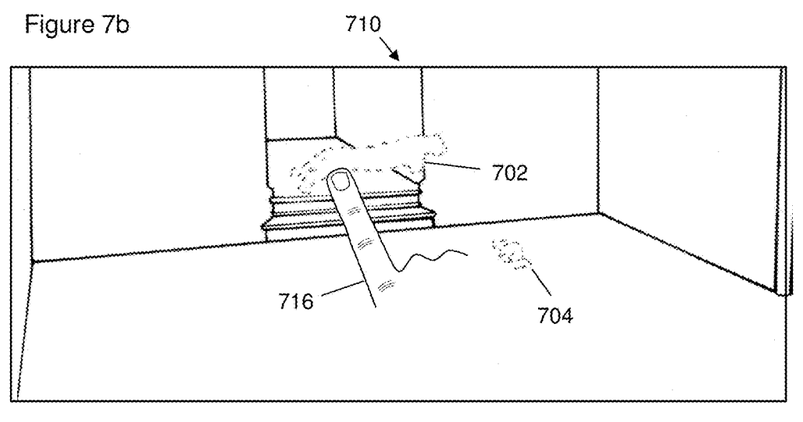
Figure 7C:
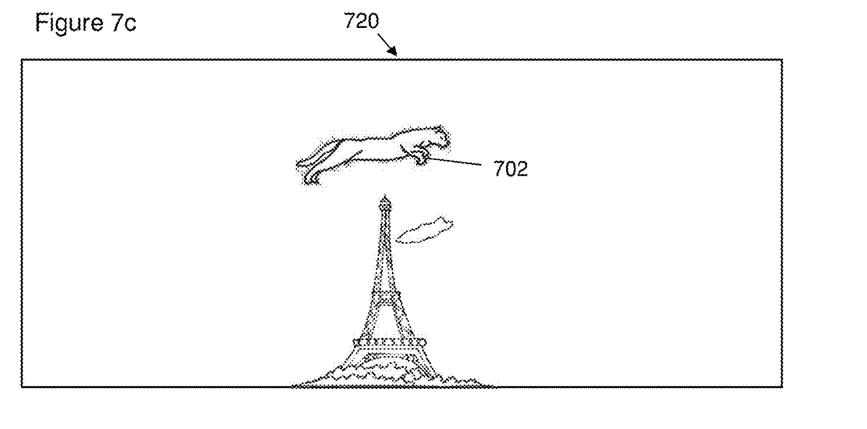

In the examples of FIGS. 5*a*-5*d* and 6*a*-6*d*, each of the scenes had a constant background and only the selectable objects varied between them. However, in other examples this may not be the case. FIGS. 7*a*-7*c* illustrate such an example.

FIG. 7*a* shows a first scene 700 in which a cat 702 is leaping towards a mouse 704 against a background of the inside of a room in Paris. Both the cat 702 and mouse 704 are selectable objects and are presented to the user as such in viewfinder view 710 of FIG. 7*b*. The user 716 selects just the cat 702 by tapping on its location in the viewfinder view 710.

The user then turns the camera to face out of the window, from where there is a good view of the Eiffel Tower. FIG. 7*c* shows the resulting viewfinder view 720. In this example the previously selected cat 702 remains displayed but there are now no selectable objects in the viewfinder view 720; however, in alternative examples the Eiffel Tower might be selectable, for example. If the user now captures the image, the selected cat 702 will be overlaid onto the scene 720 of the Eiffel Tower in the resulting composite image, with the novel result that the cat 702 appears to be jumping over the Eiffel Tower.

It may be necessary to detect the objects that are to be selectable by the user input that instructs their selection (e.g. a tap gesture at the object's location). Alternatively, the objects may not be detected prior to the user input, but may be detected after or during the user input and in some examples on the basis of that input.

There are many different ways in which the selectable objects can be detected, and any suitable approach may be used. Examples of some approaches that may be suitable are explained below with reference to FIGS. 81*a*-8*f*.

Figure 8A:
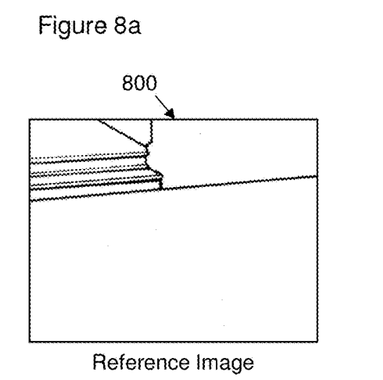
FIGS. 8*a*-8*f* illustrate examples of various approaches to object detection.
Figure 8B:
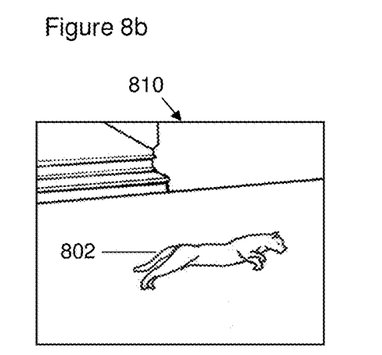

FIG. 8*a* illustrates a reference image that has been captured of a scene 800. The purpose of the reference image is to define what image content should be considered background and therefore not made selectable as an object. In this example everything present in the reference image is considered to be background. FIG. 8*b* illustrates a second scene 810 that has the same background, but in which a cat 802 is now present. The cat 802 can easily be detected as an object by comparing the first 800 and second 810 scenes and looking for image areas that differ. Where areas of the image differ between the two scenes 800, 810 these areas may be detected as selectable objects. If more than one new object were present in scene 810, the objects might be differentiated from one another and made independently selectable; this differentiation may be based on the presence of discontiguities between the objects, object detection based on different image characteristics such as colour, edge detection, or any other suitable method. Because it has been detected as an object that has been introduced to the scene 800,810 after the reference image was captured, the cat 802 can be made selectable by the user as a selectable object.

Figure 8C:
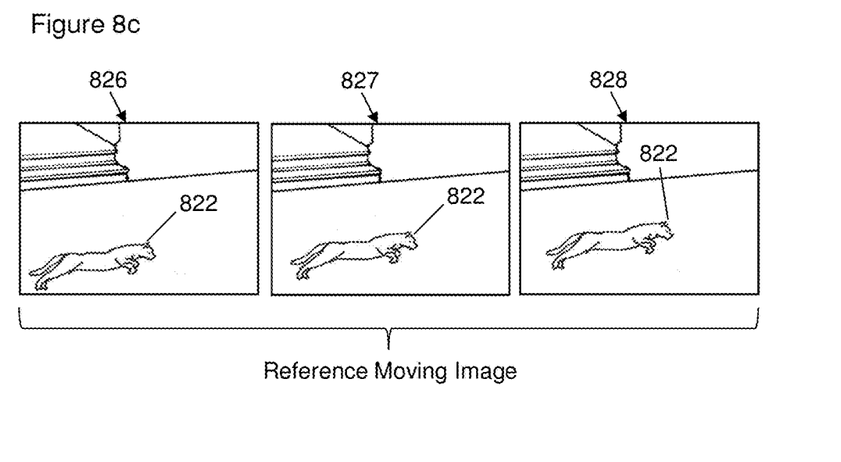
Figure 8D:
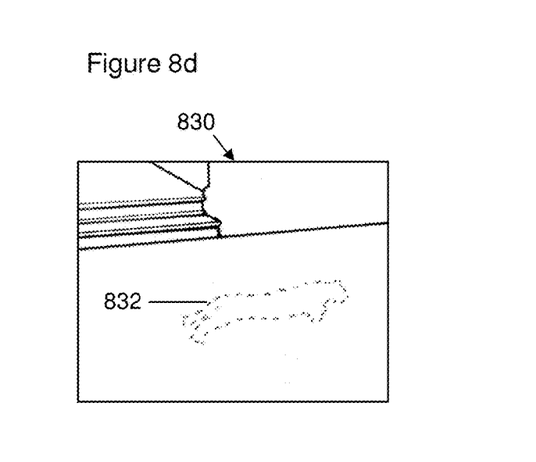
Figure 8E:
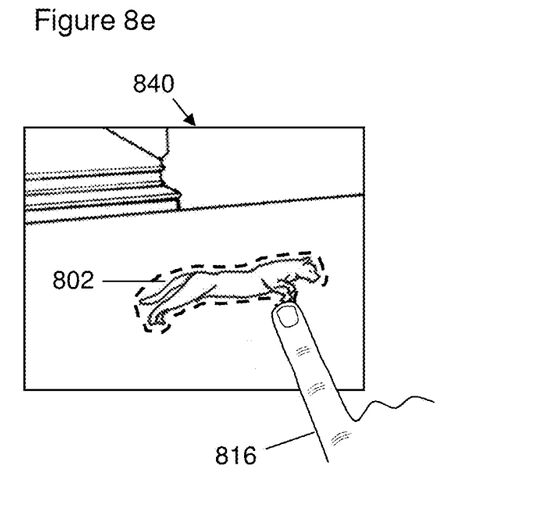

The reference image is not necessarily a static image, but may comprise a moving image (i.e. a video). FIG. 8*c* illustrates three frames 826, 827, 828 from such a reference moving image. Each of these three frames 826, 827, 828 includes a cat 822 set against a background. Although the cat 822 is present in each frame 826, 827, 828 it can be distinguished as an object that is separate from the background because its position relative to the background varies between the frames 826, 827, 828 (the cat is jumping up and to the right). FIG. 8*d* illustrates a subsequent viewfinder view 830 in which the cat 822/832 is again present and because it has already been identified as a selectable object from the reference moving image, it can be identified as such in the view finder view 830 also and has been differentiated 832 to alert the user to its selectability. In FIG. 8*d* the background is shown in this example as being the same as the background of the reference moving image, but once an object has been identified against the background in the reference moving image the object may then be known to the object detection process and subsequently detectable against any background.

In some examples object may be detected based on any user input that differentiates the object from the background (and/or from other objects). For example, in the viewfinder view 840 FIG. 8*e* the user 816 has traced around the periphery of the cat 802 with his finger, effectively cutting out this object from the background and making it selectable. The action of defining the object may also select it—that is to say that in this case once the user has drawn around the periphery of the cat 802 in the viewfinder view then the cat object 802 may be determined to be selected without a further user input being required to select it.

Figure 8F:
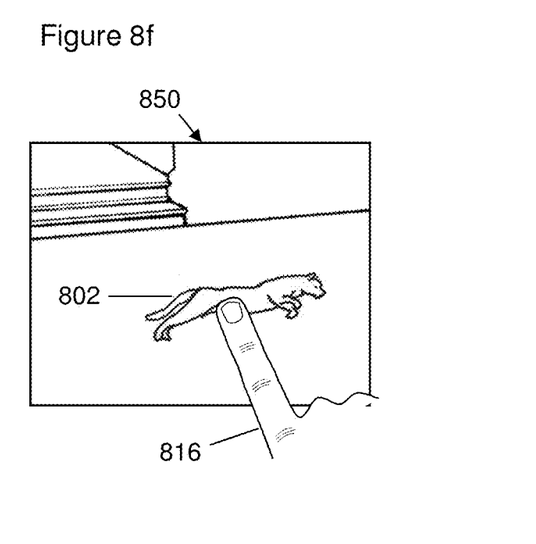

FIG. 8F shows another example of how an object can be detected in a viewfinder view 850 based on a user input. In this example the user 816 has not drawn around the cat 802, but has instead provided an input that indicates that there is an object at a particular location that he wishes to select. In the example shown in FIG. 8F the user input is a tap on top of the cat 802, but it may instead be any other input suitable for identifying a location or area within the viewfinder view. The area of the image that corresponds to the object that the user is selecting can then be determined in any suitable way. For instance, edge detection may be used to identify the boundary of an area of the image within which the identified location lies (e.g. the periphery of the cat 802). Alternatively, or additionally, the viewfinder view can be compared against a library of definitions of known objects, for example a library that contains images of known objects and/or a library that contains descriptions of identifying features of known objects (e.g. colours, patterns, shapes, etc.) Based on the comparison, a known object at the location identified by the user input may be recognised (detected) and selected.

Where object recognition is used, priority may be given to certain recognised objects. For example, objects that are known to be known to the user (e.g. people who appear in a list of the user's list of contacts, or categories of objects (e.g. cars, birds, foods) that are known to match the user's interests may be prioritised. Such prioritisation may involve lowering a minimum similarity required for the object to be detected, or may be used when determining which of a number of detected objects should be made selectable (e.g. when a large number of objects are detected, it may be that only a smaller number of the highest priority objects are made selectable, e.g. to simplify the user interface).

In some examples the selectable objects may be detected prior to receiving the user selecting one or more of them. In other examples the detection may occur after a user input that is intended to identify and select an object.

Figure 9:
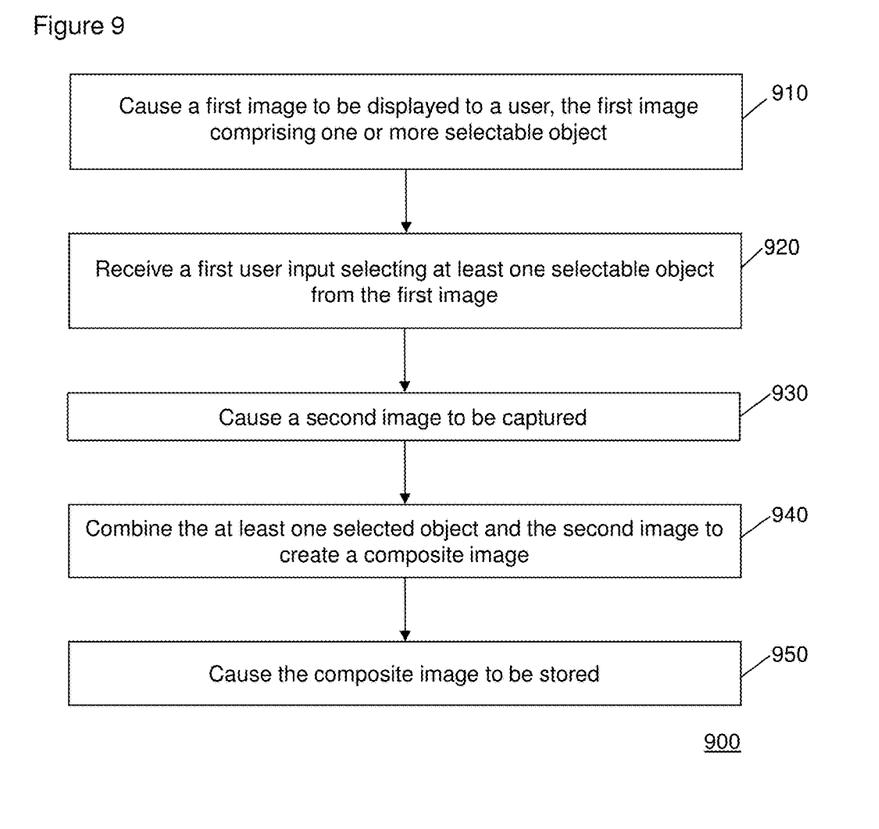
FIG. 9 is a flowchart according to an example method.
Figure 10:
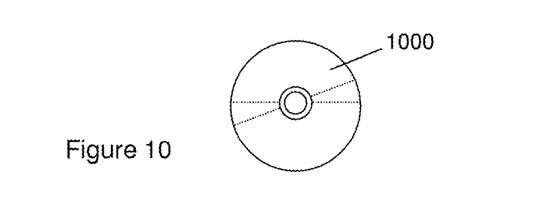
FIG. 10 illustrates schematically an example computer readable medium providing a program.

FIG. 9 illustrates an example of a method 900. The method 900 begins by causing 910 a first image to be displayed to a user, the first image comprising one or more selectable objects. The method 900 continues by receiving 920 a first user input selecting at least one selectable object from the first image. The method continues by causing 930 a second image to be captured, after at least one selectable object has been selected. The method continues by combining 940 the at least one selected object and the second image to create a composite image. Finally, the method causes the composite image to be stored. This method may be adapted, in various further examples, to include any of the functionality described previously.

Without in any way limiting the scope, interpretation, or application of the claims appearing below, a technical effect of one or more of the example embodiments disclosed herein is that a user is able to create a composite image at the time of capture, rather than needing to separately capture all the elements required for the composite image and combine them together later using post-processing. Not only is this more convenient and time efficient for the user, but it does not require him to remember his intended composition until such time as he is able to perform the post-processing. Instead, his finished composite image is available to him immediately.

Example embodiments of the present invention may be implemented in software, hardware, application logic or a combination of software, hardware and application logic. The software, application logic and/or hardware may reside on a removable memory, within internal memory or on a communication server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted in FIG. 1. A computer-readable medium may comprise a computer-readable storage medium that may be any media or means that can contain or store the instructions for use by or in connection with an instruction execution system, apparatus, or device, such as a computer. An example of a computer readable medium that may be suitable for this purpose is the CD 1000 illustrated in FIG. 10.

In some example embodiments, the invention may be implemented as an apparatus or device, for example a mobile communication device (e.g. a mobile telephone), a digital camera, a PDA, a computer or other computing device, or a video game console.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Furthermore, although particular combinations of features have been described in the context of specific examples, it should be understood that any of the described features may be present in any combination that falls within the scope of the claims.

What is claimed:

1. A method comprising:
   causing a first image of a first real-time scene to be displayed to a user on a view-finder;
   receiving a first user input selecting a portion of the first real-time scene;
   determining a selected object in the first image by using at least an object recognition process to process the selected portion of the first image;
   processing a second real-time scene to identify a second instance of the selected object in a changed position from the first real-time scene to the second real-time scene;
   causing the second real-time scene to be displayed on the view-finder such that the second instance of the selected object is visually distinguished as at least one selectable object in the second real-time scene relative to non-selectable portions, and such that the selected object from the first image is overlaid on the view-finder in a position on the view-finder indicated by the first user input;
   receiving an indication of a user-selection of the at least one selectable object in the second real-time scene;
   causing display of a third real-time scene on the view-finder, with the selected object from the first image overlaid on the view-finder in a position on the view-finder indicated by the first user input, and the at least one selectable object from the second real-time scene in a position on the view-finder indicated by the user-selection in the second real-time scene; and
   in response to a user capture input while the third real-time scene is displayed, a) causing a second image to be captured, wherein the second image reflects the third real-time scene, b) combining the selected object from the first image, the at least one selectable object from the second real-time scene, and the second image to create a composite image, and c) causing the composite image to be stored.

2. The method of claim 1 further comprising:
   causing the selected object to be visually differentiated from a background of the first image prior to receiving the first user input.

3. The method of claim 1, wherein the first user input comprises a selection of at least one location in the displayed first image that is associated with a selectable object to be selected.

4. The method of claim 3, wherein:
   displaying the first image comprises displaying the first image on a touch screen;
   the location associated with each selectable object corresponds to an area of the displayed image in which that selectable object is displayed; and
   the first user input comprises at least one touch gesture within one such area.

5. The method of claim 4, wherein the touch gesture is a tap.

6. The method of claim 1, further comprising causing the first image to be captured, prior to causing the first image to be displayed.

7. The method of claim 1, further comprising:
causing a reference image to be captured;
comparing the first image to the reference image; and
based on said comparison, detecting the at least one selectable object and making it selectable.

8. The method of claim 1, further comprising:
causing a reference moving image to be captured; and
comparing frames of the reference moving image with one another to detect the at least one selectable object.

9. The method of claim 8, further comprising:
detecting moving objects in the reference moving image based on said comparison, and
detecting the at least one selectable object by detecting objects in the first image that correspond to the detected moving objects in the reference moving image.

10. The method of claim 1, further comprising:
detecting the at least one selectable object based on edge detection.

11. The method of claim 1, further comprising:
detecting the at least one selectable object based on a first user input defining the one or more selectable objects.

12. The method of claim 1, further comprising:
detecting the at least one selectable object based on a comparison of the image with a library of object definitions.

13. The method of claim 1, wherein the composite image comprises the selected object positioned relative to the third real-time scene based on the position of the selected object relative to the first real-time scene.

14. The method of claim 1, wherein the composite image comprises the selected object in more than one position based on a plurality of selections of the selected object from the view-finder in a plurality of real-time scenes, wherein each selection is made from the view-finder at respective different moments in time.

15. Apparatus comprising:
a processor; and
memory including computer program code,
the memory and the computer program code configured to, working with the processor, cause the apparatus to perform at least the following:
cause a first image of a first real-time scene to be displayed to a user on a view-finder;
receive a first user input selecting a portion of the first real-time scene;
determine a selected object in the first image by using at least an object recognition process to process the selected portion of the first image;
process a second real-time scene to identify a second instance of the selected object in a changed position from the first real-time scene to the second real-time scene;
cause the second real-time scene to be displayed on the view-finder such that the second instance of the selected object is visually distinguished as at least one selectable object in the second real-time scene relative to non-selectable portions, and such that the selected object from the first image is overlaid on the view-finder in a position on the view-finder indicated by the first user input;
receive an indication of a user-selection of the at least one selectable object in the second real-time scene;
cause display of a third real-time scene on the view-finder, with the selected object from the first image overlaid on the view-finder in a position on the view-finder indicated by the first user input, and the at least one selectable object from the second real-time scene in a position on the view-finder indicated by the user-selection in the second real-time scene; and
in response to a user capture input while the third real-time scene is displayed, a) cause a second image to be captured, wherein the third image reflects the real-time scene, b) combine the selected object from the first image, the at least one selectable object from the second real-time scene, and the second image to create a composite image, and c) cause the composite image to be stored.

16. The apparatus of claim 15, wherein the memory and the computer program code are further configured to, working with the processor, cause the apparatus to further perform at least the following:
cause the selected object to be visually differentiated from a background of the first image prior to receiving the first user input.

17. The apparatus of claim 15, being a mobile telephone.

18. The apparatus of claim 15, being a digital camera.

19. A computer program product comprising a non-transitory computer-readable medium bearing computer program code embodied therein for use with a computer, the computer program code comprising:
code for causing a first image of a first real-time scene to be displayed to a user on a view-finder;
code for receiving a first user input selecting a portion of the first image;
code for determining a selected object in the first image by using at least an object recognition process to process the selected portion of the first image;
code for processing a second real-time scene to identify a second instance of the selected object in a changed position from the first real-time scene to the second real-time scene;
code for causing the second real-time scene to be displayed on the view-finder such that the second instance of the selected object is visually distinguished as at least one selectable object in the second real-time scene relative to non-selectable portions, and such that the selected object from the first image is overlaid on the view-finder in a position on the view-finder indicated by the first user input;
code for receiving an indication of a user-selection of the at least one selectable object in the second real-time scene;
code for causing display of a third real-time scene on the view-finder, with the selected object from the first image overlaid on the view-finder in a position on the view-finder indicated by the first user input, and the at least one selectable object from the second-real time scene in a position on the view-finder indicated by the user-selection in the second real-time scene; and
code for, in response to a user capture input, a) causing a third image to be captured, wherein the second image reflects the second real-time scene, b) combining the selected object from the first image, the at least one selectable object from the second-real time scene, and the second image to create a composite image, and c) causing the composite image to be stored.

* * * * *